United States Patent
Barbosa et al.

(10) Patent No.: US 10,229,189 B2
(45) Date of Patent: *Mar. 12, 2019

(54) SYSTEM FOR GENERATION OF AUTOMATED RESPONSE FOLLOW-UP

(71) Applicant: International Business Machines Corporation, Armonk, NY (US)

(72) Inventors: Jose Barbosa, New Bedford, MA (US); Ashok T. Kumar, North Chelmsford, MA (US); Dan O'Connor, Milton, MA (US); William G. O'Keeffe, Tewksbury, MA (US); David D. Taieb, Charlestown, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/161,490

(22) Filed: May 23, 2016

(65) Prior Publication Data

US 2017/0337264 A1    Nov. 23, 2017

(51) Int. Cl.
*G06F 17/30* (2006.01)
*G06F 8/38* (2018.01)
*G06F 9/451* (2018.01)

(52) U.S. Cl.
CPC .......... *G06F 17/30684* (2013.01); *G06F 8/38* (2013.01); *G06F 9/453* (2018.02); *G06F 17/30654* (2013.01); *G06F 17/30696* (2013.01); *G06F 17/30699* (2013.01)

(58) Field of Classification Search
None
See application file for complete search history.

(56) References Cited

U.S. PATENT DOCUMENTS

| | | | |
|---|---|---|---|
| 2008/0183494 A1* | 7/2008 | Cuddihy | G06F 19/3418 705/2 |
| 2009/0222551 A1* | 9/2009 | Neely | G06F 17/30864 709/224 |
| 2012/0117005 A1 | 5/2012 | Spivack | |
| 2014/0072948 A1 | 3/2014 | Boguraev et al. | |
| 2014/0222743 A1* | 8/2014 | Baughman | G06N 5/02 706/46 |
| 2015/0039536 A1 | 2/2015 | Cook et al. | |
| 2015/0095855 A1 | 4/2015 | Bai et al. | |
| 2015/0100521 A1 | 4/2015 | Kozloski et al. | |

(Continued)

OTHER PUBLICATIONS

List of IBM Patents or Patent Applications Treated as Related, May 24, 2016, 2 pages.

(Continued)

*Primary Examiner* — Son T Hoang
(74) *Attorney, Agent, or Firm* — Cantor Colburn LLP; Will Stock

(57) ABSTRACT

Aspects include generation of automated response follow-up. A response to a question is received at a response follow-up system. The response follow-up system analyzes the response using natural language processing to identify one or more response terms. The response follow-up system generates one or more follow-up questions based on the one or more response terms. The response follow-up system modifies an aspect of a user interface based on the one or more follow-up questions.

17 Claims, 11 Drawing Sheets

(56) References Cited

U.S. PATENT DOCUMENTS

| | | |
|---|---|---|
| 2015/0143281 A1 | 5/2015 | Mehta et al. |
| 2015/0186784 A1 | 7/2015 | Barborak et al. |
| 2016/0110347 A1 | 4/2016 | Kennewick, Jr. et al. |
| 2016/0203500 A1* | 7/2016 | Williams ........... G06Q 30/0203 705/7.32 |

OTHER PUBLICATIONS

U.S. Appl. No. 15/161,478, filed May 23, 2016, Entitled: System for Determination of Automated Response Follow-Up.

List of IBM Patents or Patent Applications Treated as Related, Sep. 10, 2018, 2 pages.

U.S. Appl. No. 16/125,829, filed Sep. 10, 2018, Entitled: System for Determination of Automated Response Follow-Up, First Named Inventor Jose Barbosa.

U.S. Appl. No. 16/125,831, filed Sep. 10, 2018, Entitled: System for Generation of Automated Response Follow-Up, First Named Inventor Jose Barbosa.

* cited by examiner

SYSTEM FOR GENERATION OF AUTOMATED RESPONSE FOLLOW-UP

BACKGROUND

The invention relates generally to question-answering computer systems, and more specifically, to a system for generation of automated response follow-up.

An information retrieval computer system typically receives a query, identifies keywords in the query, searches a corpus of data for the keywords, and ranks results of the searching to identify best matches. Some information retrieval computer systems output a list of best matching results to a user, such that the user can then attempt to determine if desired information can be found in the results. When the results are incomplete or the user does not find the desired information, the user typically generates one or more new queries to continue the searching process. Additionally, upon reviewing the results, the user may determine that a follow-up query is needed to locate further related information.

SUMMARY

According to an embodiment a method, system, and computer program product for generation of automated response follow-up are provided. The method includes receiving a response to a question at a response follow-up system. The response follow-up system analyzes the response using natural language processing to identify one or more response terms. The response follow-up system generates one or more follow-up questions based on the one or more response terms. The response follow-up system modifies an aspect of a user interface based on the one or more follow-up questions.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments determine one or more follow-up questions based on a response to an initial question. The follow-up questions can be automatically asked to generate associated responses, which may be displayed or linked with the response. Follow-up questions can be generated based on the contents of a response (also referred to as an "answer" herein) to a question in a question-answering computer system or based on historical data of questions asked by previous users in question-response pairs. In an embodiment, natural language processing is used to analyze a response to a question and determine whether one or more potential follow-up questions are contained within the response. In another embodiment, a list of common follow-up questions for an identified question-response pair can be used for generating follow-up questions, where natural language processing may be used to group similar follow-up questions to refine the list of common follow-up questions as question-response pairs are observed.

Figure 1:
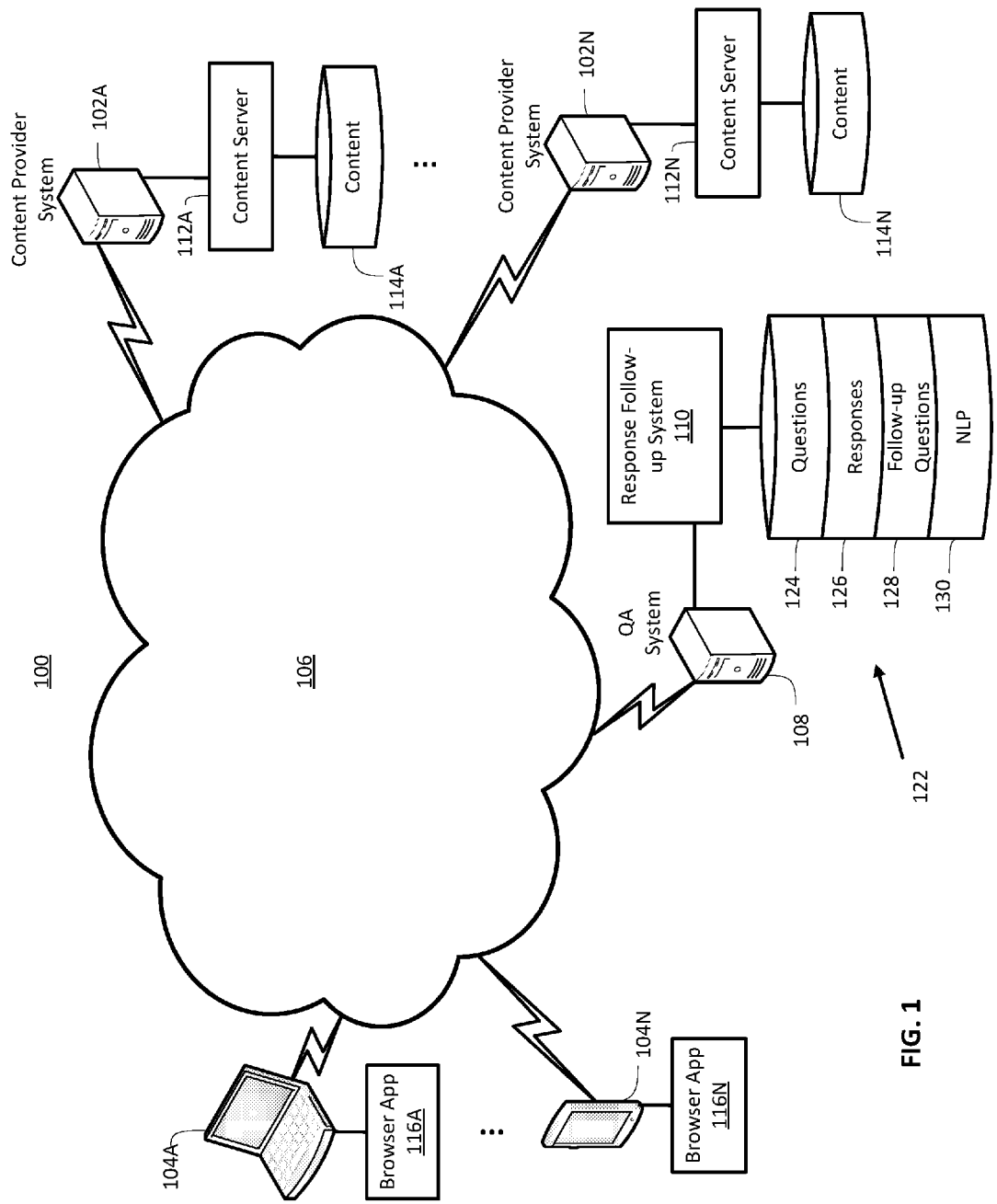
FIG. 1 depicts a system in accordance with an embodiment.

Turning now to FIG. 1, an example of a system 100 upon which automated response follow-up may be implemented will now be described in greater detail. The system 100 represents a networked environment, such as the Internet, where users can engage in question-response interactions to retrieve answers/content and the like using an interactive question answering system.

In the example depicted in FIG. 1, the system 100 includes a plurality of content provider systems 102A-N including content servers 112A-N configured to send content 114A-N to one or more electronic devices 104A-N over a network 106 in response to questions 124 received at question-answering system 108. Questions 124 from one or more browser applications 116A-N of the electronic devices 104A-N can be received and tracked by a response follow-up system 110 at the question-answering system 108. The question-answering system 108 converts the questions 124 received in a natural language format into one or more queries for the content servers 112A-N to determine responses 126. Content 114A-N may be returned directly to one or more of the browser applications 116A-N or can be reformatted as responses 126 and sent to one or more of the browser applications 116A-N. When the content 114A-N is sent directly to one or more of the browser applications 116A-N, the response follow-up system 110 may also track aspects of the content 114A-N in responses 126. The responses 126 can be used to generate follow-up questions 128 that can be returned back to one or more browser applications 116A-N or can be used by the response follow-up system 110 to pre-fetch one or more follow-up responses to the follow-up questions 128 from the content servers 112A-N. Pre-fetched follow-up responses to the follow-up questions 128 can be sent with the responses 126 to the one or more browser applications 116A-N or as a link within the responses 126 to the one or more browser applications 116A-N.

Although only one question-answering system 108 is depicted in FIG. 1, it will be understood that there can be multiple question-answering systems 108 which can interface with other networked components, such as content provider systems 102A-N and electronic devices 104A-N across the network 106 over a geographically wide area. The value of "N" refers to an arbitrary number and need not include the same number of content provider systems 102A-N and electronic devices 104A-N for instance. Further, a portion or all of the question-answering system 108 can be combined with one or more of the content provider systems 102A-N. The network 106 may be any type of communications network known in the art and can include a combination of wireless, wired, and/or fiber optic links.

In exemplary embodiments, the content provider systems 102A-N and the question-answering system 108 are each implemented on a high-speed processing device (e.g., a mainframe computer system, a cloud computing system, or the like) including at least one processing circuit (e.g., a computer processor/CPU) capable of reading and executing instructions, and handling interactions with various components of the system 100. Alternatively, the content provider systems 102A-N and/or the question-answering system 108 can be embodied entirely in hardware including circuits and memory to perform processes as described herein. In the example of FIG. 1, the content provider systems 102A-N include content servers 112A-N configured to provide content 114A-N to one or more of the electronic devices 104A-N. Each of the content servers 112A-N may be an application executable on a respective instance of the content provider systems 102A-N. The content 114A-N may be web-enabled content, such as one or more web pages or web applications that are accessible through browser applications 116A-N on electronic devices 104A-N.

In exemplary embodiments, the electronic devices 104A-N can include a variety of computing devices with processing circuits and I/O interfaces, such as keys/buttons, a touchscreen, audio input, a display device and audio output. The electronic devices 104A-N may be embodied in any type of computing device known in the art, such as a laptop, tablet computer, mobile device, personal computer, workstation, server, and the like. Accordingly, the electronic devices 104A-N can include various computer/communication hardware and software technology known in the art, such as one or more processing units or circuits, volatile and non-volatile memory including removable media, power supplies, network interfaces, support circuitry, operating systems, and the like.

The response follow-up system 110 can interface with the content servers 112A-N to determine responses 126 to questions 124 and provide the responses 126 to a user of one of the electronic devices 104A-N along with follow-up questions 128 and/or follow-up responses. For instance, upon receiving a question at the question-answering system 108, an application of the question-answering system 108, such as response follow-up system 110, parses the question using natural language processing 130 according to known parsers and tools. Examples of parsers that can be used include, but are not limited to an English Slot Grammar (ESG) parser from IBM and the OpenNLP suite of language processing tools. The question or a substantial equivalent of the question (e.g., relevant question terms) can be stored with questions 124 in repository 122. The natural language processing 130 algorithms applied by response follow-up system 110 can be applied to retrieve a response to the question from one or more of the content servers 112A-N, where the content 114A-N forms a corpus of answers in a cluster of documents including related questions and may also provide evidence for answer scoring to select a best response. Responses or a substantial equivalent of the responses (e.g., relevant response terms) can be stored as responses 126 in repository 122. The repository 122 can also track sequencing and pairing information, such as a sequential order of questions 124 as paired with corresponding responses 126.

The response follow-up system 110 can generate follow-up questions 128 by maintaining a list of questions 124 asked by all users and by monitoring which questions 124 are asked in succession of another question. For example, a question can be "how do I delete my browser cache?" which may have a response that includes multiple instructions such as text along the lines of " . . . Performing this operation will not delete your saved passwords . . . " A subsequently observed question may be "how do I delete my saved passwords?" where there is an association between terms of the initial response and the subsequent question. The initial question and response can be marked in questions 124 and responses 126 as a question-response pair and the subsequent question can be associated to the question-response pair in follow-up questions 128. As relationships are created by the response follow-up system 110 between the questions 124, responses 126, and follow-up questions 128, confidence values can be created that track how often each sequence is observed.

One or more of the follow-up questions 128 associated with a question-response pair can be automatically embedded within the response to a question as one or more links modifying an aspect of a user interface to allow the user to easily ask the follow-up questions 128. In embodiments where confidence values are tracked and multiple follow-up questions 128 exist for a given question-response pair, the confidence values can be used to display the links in a ranked order (e.g., more frequently asked follow-up questions appearing first or more prominently with the response). As users of browser applications 116A-N select links to ask the follow-up questions 128, the confidence values can be updated by the response follow-up system 110. Confidence values may also be used to establish a training phase, where a follow-up question is selected from the follow-up questions 128 upon confirming that an associated confidence value is greater than a minimum confidence threshold.

In some embodiments, rather than returning the text of the follow-up questions 128 or links to the follow-up questions 128, the response follow-up system 110 can automatically ask the follow-up questions 128 to generate one or more follow-up responses (e.g., from content servers 112A-N) that can be returned along with the response to the initial question. An aspect of a user interface of browser applications 116A-N can be modified to include follow-up responses or links to follow-up responses.

In some embodiments, the response follow-up system 110 analyzes one or more response terms in a response to a question and dynamically determines whether one or more follow-up questions 128 are contained within the response or can be derived from the response using the natural language processing 130. For example, a user of browser applications 116A-N may ask, "how do I create a CD from my digital music collection?" The response may be lengthy and contain information such as the following:

"If you're creating an audio CD, choose your options:
    Change the recording speed:
        Choose an option from the Preferred Speed pop-up menu.

When you burn an audio CD, the audio management tool automatically uses the best recording speed for the CD. However, if your blank CD is rated for a slower speed than the maximum speed of your drive, or if you experience problems creating CDs, you may want to change the recording speed to match the CD's rating.

Change the amount of silence between songs.

Have all the songs on the disc play at the same volume: Select Use Sound Check.

Include information that disc players in some vehicles can display:
Select Include CD Text."

Known natural language processing techniques can be used to parse the response to detect boundaries such as paragraphs, sentences, list items, questions, and the like and to identify concepts in response terms. Relationships between concepts can be established and further linked with known variants to form annotated graphs, for example. The concepts and relationships in response terms can be used to search relational structures for related follow-up questions. The response follow-up system 110 may also identify negation, such as "Don't click button x", where "click" would be a concept, "button x" would be a concept, and the concept for "click" would have negated=true. Depending on the implementation, "button x" could have negated=true as well, or a relationship can be extracted between the two concepts that is negated.

With continued reference to the example response above, one of the follow-up questions 128 may be, "how do I change the amount of silence between songs?" where "Change the amount of silence between songs" is an example of response terms extracted from the response. Other concepts identified in the response may include "CD" and "audio management tool". The natural language processing 130 used by the response follow-up system 110 may seek to identify response terms that are actual questions or in a command/instruction context as subject matter for generating the follow-up questions 128.

In this example, the response terms "Change the amount of silence between songs" can be changed to a hyperlink as a modification to an aspect of the user interface of the browser applications 116A-N. Clicking on the hyperlink may automatically invoke the follow-up question, "how do I change the amount of silence between songs?" when clicked, or the response follow-up system 110 may automatically ask the follow-up question and insert the follow-up response into the original response.

To aid in identifying follow-up questions 128, the response follow-up system 110 can track all the questions 124 asked of the system 100, identify the concepts referenced within them (which can be stored and not computed each time), and calculate the distance from those concepts to the given concept in the response to determine how closely they are related. This can be performed for all of the concepts in each of the boundaries. For instance, a question may be found that referenced two concepts, each of which appears in a sentence in the response. At a higher level, questions can be may be found that are closely related to the concepts in a list item, list, or paragraph. Each question may have a calculated distance from the concept/sentence/list-item/list/paragraph in the response that can be used to determine which questions to present as follow-up questions 128. The response follow-up system 110 can also take into account the number of times a related question has been asked of the system 100, whether it is already a historical follow-up question (and if it is highly rated) to increase or decrease the score. Questions that are not only related to a sentence, but are closely related to many parent boundaries can also have an increased score. Historical follow-up questions can be used to identify concepts that are of concern to users reading the response and be used to find other potential follow-up questions.

Searching for a concept, such as "silence between songs", may result in identifying multiple questions with related concepts, such as "How much of a gap should I have between songs", "What does silence between songs mean", and "How do I change the amount of silence between songs". A combination of metrics such as a distance score, historical follow-up question selection, and/or user feedback scores can be used to rank and select the best candidates and filter out lower scoring results. Scoring processes may also weigh manually-entered follow-up questions higher than linked/generated follow-up questions.

In some embodiments, when multiple responses to an initial question are received (but only the top-scoring response is displayed), a lower confidence response may also be used to generate follow-up question candidates. For instance, the top four or five responses may actually be relevant and useful to the user. It may be relatively safe to look at the top three returned response documents/text segments to look for follow-up questions in the same manner, where the follow-up questions generated for the second and third highest scored responses would be added to the highest confidence response displayed to the user.

In embodiments where a historical record of questions 124 is not available/used, other resources such as a ground truth store (not depicted) may be used to look for concept mappings. A ground truth store can include questions mapped to known good answers for the purposes of training and testing the accuracy of the system 100. If there are no matches with respect to the ground truth store, the sentences within the response can be turned into questions. Techniques such as entity detection, temporal analysis, relationship extraction, and the like can be used to identify concepts such as people, places, dates, locations, etc. and how the concepts relate to each other in the response. Various substitutions can be used to try different possibilities. For instance, in the example "change the amount of silence between songs", questions can be based on "amount" which would become "how much". The word "change" may become "how to change" or "why change". The process can result in many different variants for a given sentence. The resulting questions can be asked back to the system 100 with the higher confidence results selected. As other sentences from the response are similarly tested as questions, the questions resulting in the highest confidence scores can be selected as the one or more follow-up questions 128 to present to the user.

In some embodiments, all the documents in a corpus can be analyzed to create a concept frequency-inverse document frequency (CF-IDF) table for concepts in documents which can be used to look up how common concepts are across the corpus. The concepts in the corpus can be compared to concepts in a question history store (if any such data exists) to see which concepts have questions asked frequently about them compared to concept prevalence in the corpus. This may indicate that a concept is not well understood in general and/or not well documented to where the general population would understand it. A low prevalence score can be used as a metric to push up the complexity score or reduce the distance score for a question to a sentence, for instance.

The response follow-up system 110 can also consider how concepts are used across the corpus and not just in the response text to determine how to generate follow-up questions 128. For example, take the concept "Sound Check" in the above example response. Here, "Sound Check" is referred to as an option to be selected, leading to a generated follow-up question "Why select Use Sound Check", which in reality may not be of any use to the end user. However, if the concept is examined across the corpus to determine the context in which it is used, more useful questions may be generated. Thus, in looking at the corpus, text may be observed such as "Use sound check to make song volume consistent" and "All your songs will play at the same volume with sound check enabled". Follow-up questions 128 for the concept can be determined based on how it is used elsewhere in the corpus. A follow-up question may become "How to use sound check to make song volume consistent". This is likely a much more useful follow-up question for the user to understand what sound check is, rather than why a box is checked.

Figure 2:
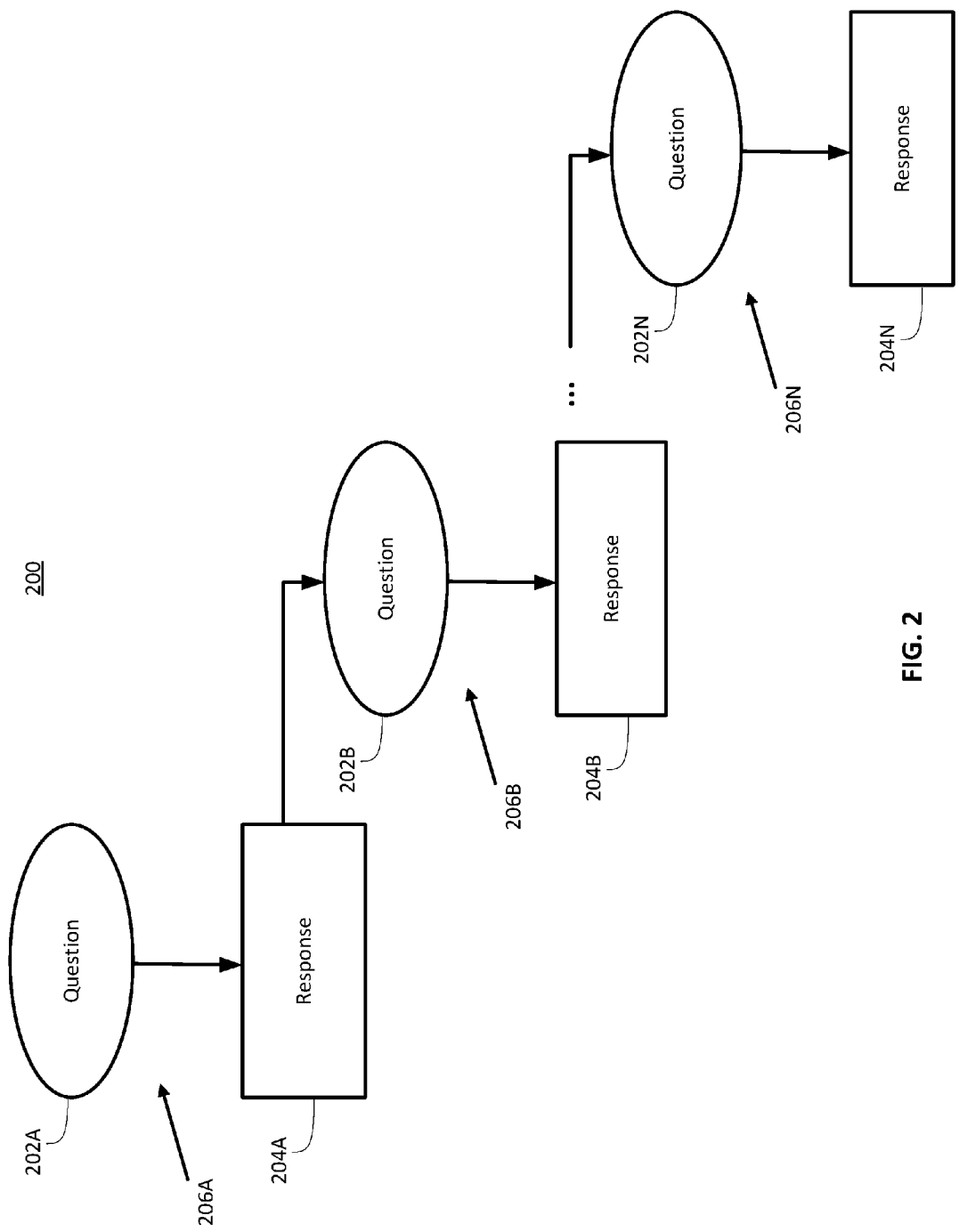
FIG. 2 depicts a sequence of questions and responses in accordance with an embodiment.

FIG. 2 depicts a sequence 200 of questions 202 and responses 204 in accordance with an embodiment. A question-response pair 206 defines an association between each question 202 and response 204. In the example of FIG. 2, question-response pair 206A includes question 202A associated with response 204A, question-response pair 206B includes question 202B associated with response 204B, and question-response pair 206N includes question 202N associated with response 204N. The sequence 200 can be tracked by the response follow-up system 110 and stored in the repository 122 of FIG. 1. Question 202B represents a follow-up question to response 204A, where one or more response terms identified in response 204A can be used to determine question 202B as a follow-up question. Response 204B is an example of a follow-up response where question 202B is a follow-up question. Similarly, response 204B to question 202B may generate one or more follow up questions with corresponding follow-up responses in the sequence 200 up to question 202N and response 204N. In some embodiments, the response follow-up system 110 can track the questions 202A-N in questions 124 of FIG. 1, responses 204A-N in responses 126 of FIG. 1, and sequencing information that associates responses with follow-up questions (e.g., response 204A with question 202B) in follow-up questions 128 of FIG. 1.

Figure 3:
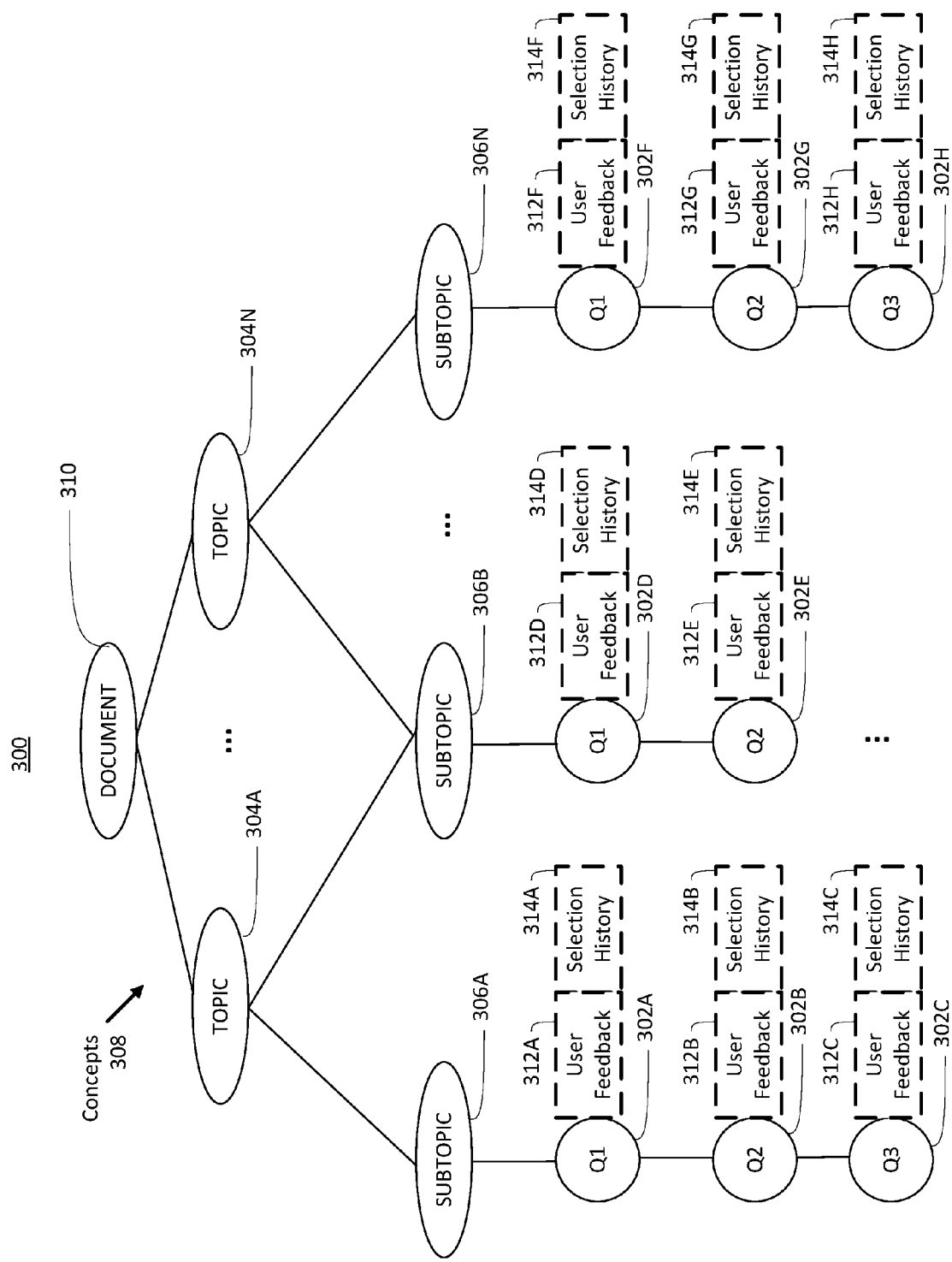
FIG. 3 depicts a structure to group questions based on topics and sub-topics in accordance with an embodiment.

FIG. 3 depicts a structure 300 to group questions 302 based on topics 304A-N and sub-topics 306A-N in accordance with an embodiment. The response follow-up system 110 of FIG. 1 can develop the structure 300 to track questions 302 associated with concepts 308 in a document 310, which may be part of content 114A-N of FIG. 1 along with other documents. Concepts 308 broadly refer to the descriptive terms captured at various levels of detail, such as sports, basketball, soccer, balls, air pumps, etc. Some topics 304A-N may have unique subtopics 306A-N and shared subtopics 306A-N. For instance, if topic 304A is basketball and topic 304N is soccer, a common subtopic 306B can be ball inflation with questions 302D and 302E such as "How do I check ball pressure?" and "How do I insert an inflation needle?". In contrast, subtopic 306A may be specific to basketball, such as rules of basketball, and subtopic 206N may be specific to soccer. In the example of FIG. 3, subtopic 306A includes questions 302A, 302B, 302C, which can have corresponding metrics, such as user feedback 312A, 312B, 312C and selection history 314A, 314B, 314C. Similarly, subtopic 306B includes questions 302D and 302E with user feedback 312D, 312E and selection history 314D, 314E. Subtopic 306N includes questions 302F, 302G, 302H, which can have corresponding metrics such as user feedback 312F, 312G, 312H and selection history 314F, 314G, 314H.

Metrics such as user feedback 312A-H and selection history 314A-H can be used to rank questions 302A-H such that a match for a particular topic 304A-304N or subtopic 306A-306N may return a higher ranked question 302 or questions 302 as one or more follow-up questions 128 based on how often particular questions 302 have been previously selected and/or feedback from users on relevance. The selection history 314A-H is an example of a history of selection metric, and user feedback 312A-H is an example of a user feedback metric. Other metrics, for instance, related to resulting answers to questions 302A-H can also be tracked to enhance confidence scoring. Further, the response follow-up system 110 can compute distance scores to determine possible relevance between response terms and the concepts 308 captured in questions 302A-H as follow-up questions.

Figure 4:
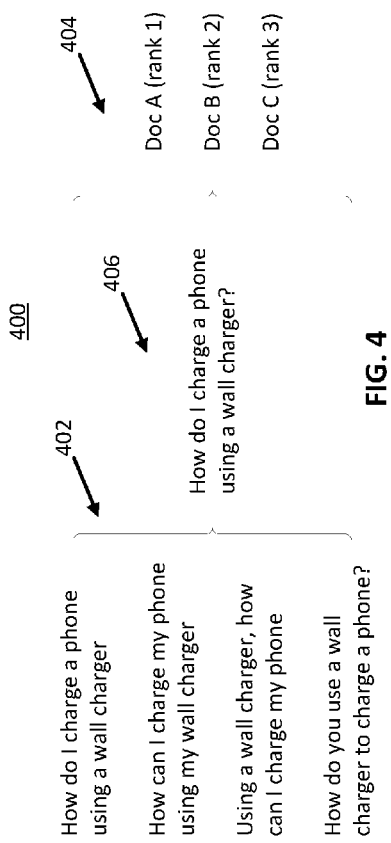
FIG. 4 depicts a reverse mapping of questions to documents in accordance with an embodiment.

FIG. 4 depicts a reverse mapping 400 of questions 402 to documents 404 in accordance with an embodiment. The response follow-up system 110 of FIG. 1 may use a mapping such as reverse mapping 400 to identify one or more semantically similar questions 402 and condense similar questions into a single question for display as a follow-up question 406, where a ranking is established between the follow-up question 406 and the documents 404 relative to the ability of each of the documents 404 to return a higher quality answer. Scoring can be performed based on a similarity score between the follow-up question 406 and questions or concepts within the documents 404 as well as any associated metrics, such as user feedback 312A-H and selection history 314A-H of FIG. 3.

Figure 5:
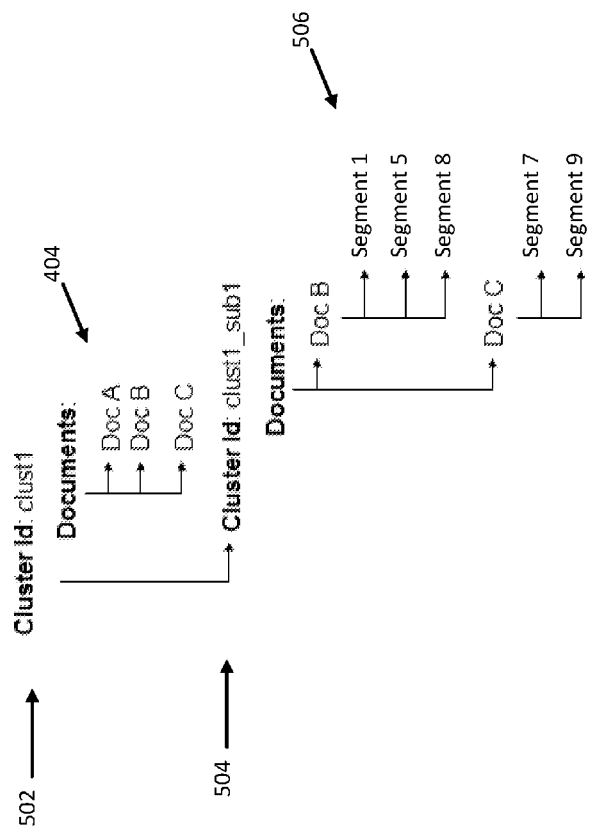
FIG. 5 depicts a group of document clusters and nested clusters in accordance with an embodiment.

FIG. 5 depicts a group of document clusters 502 and nested clusters 504 in accordance with an embodiment. Documents 404, for instance, forming a corpus in content 114A-114N of FIG. 1 can be analyzed to establish clustering relationships using known processes, such as K-means or other methods. For instance, as depicted in FIG. 4, follow-up question 406 of "How do I charge a phone using a wall charger?" may be associated with three documents 404, which could be user manuals, articles, blog posts, and the like. Concepts can be captured in portions of text in documents 404 as document segments 506, where specific sections of text in one or more of the documents 404 relate to a common concept in a nested cluster 504.

Figure 6:
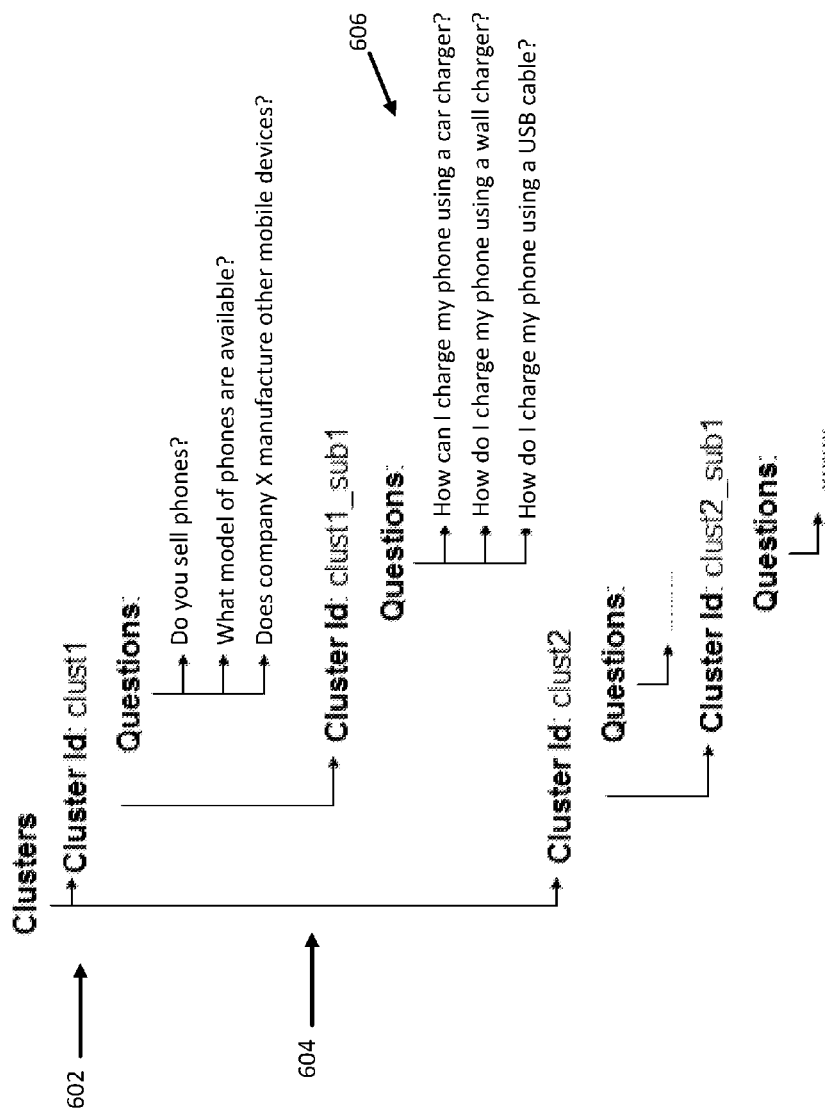
FIG. 6 depicts a categorization of questions in accordance with an embodiment.

FIG. 6 depicts an example of a categorization of questions 606 in clusters 602 and nested clusters 604. Questions 606 can have child relationships that become more specific in further child/nested clusters and can belong to multiple clusters. For example, the question "How do I charge my phone using a wall charger?" could be a child of a cluster for "phone problems" and also be a child of a cluster for "charging problems". The number of questions 606 in each cluster 602 can be used along with the frequency of selection to determine which follow-up questions to present to a user.

Figure 7:
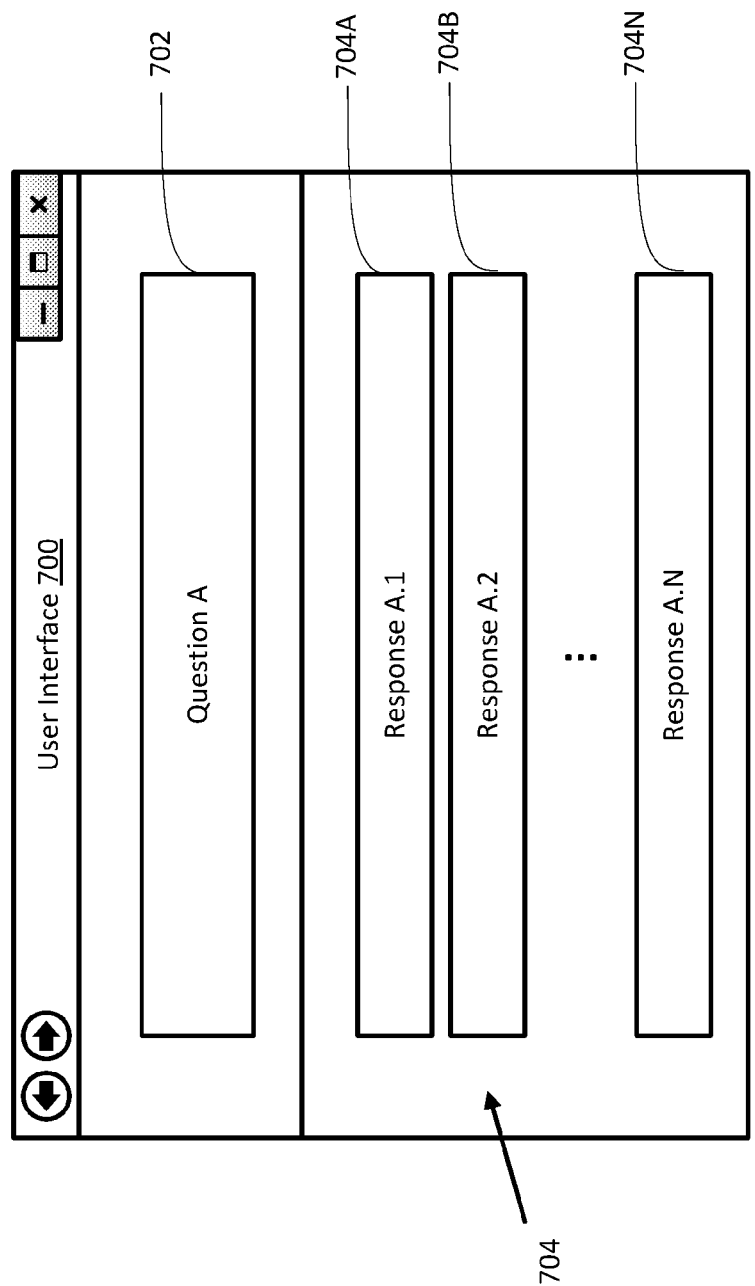
FIG. 7 depicts a user interface with a response to a question in accordance with an embodiment.
Figure 8:
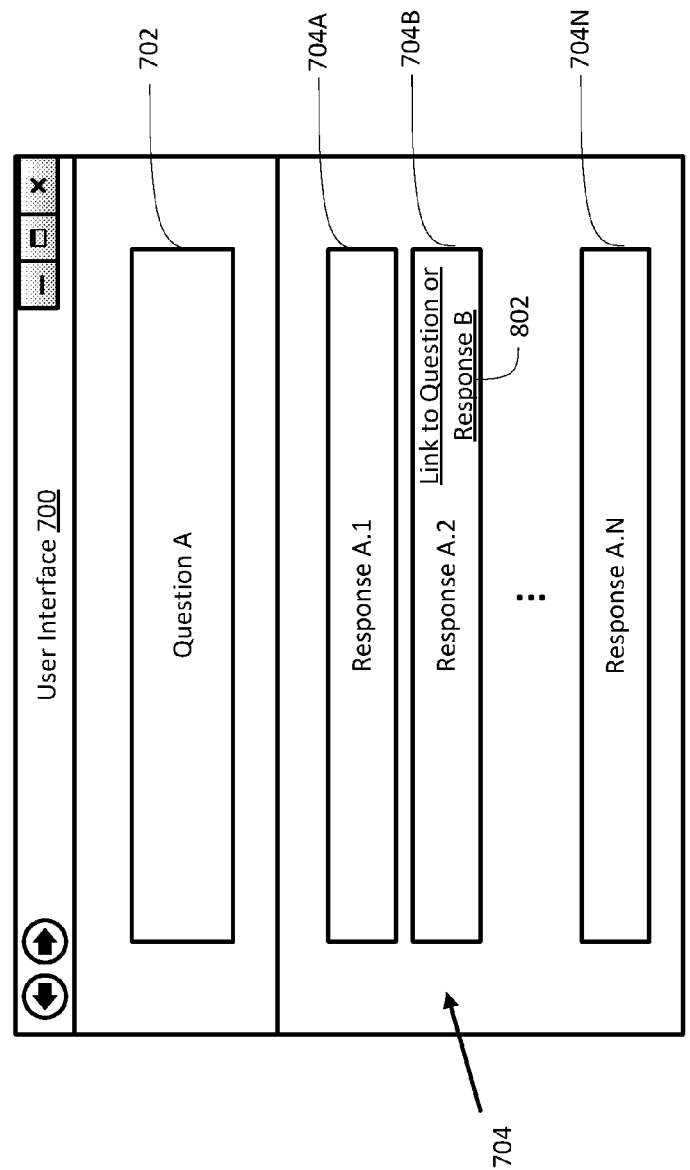
FIG. 8 depicts a modification to the response of FIG. 7 as updated using a response follow-up system in accordance with an embodiment.
Figure 9:
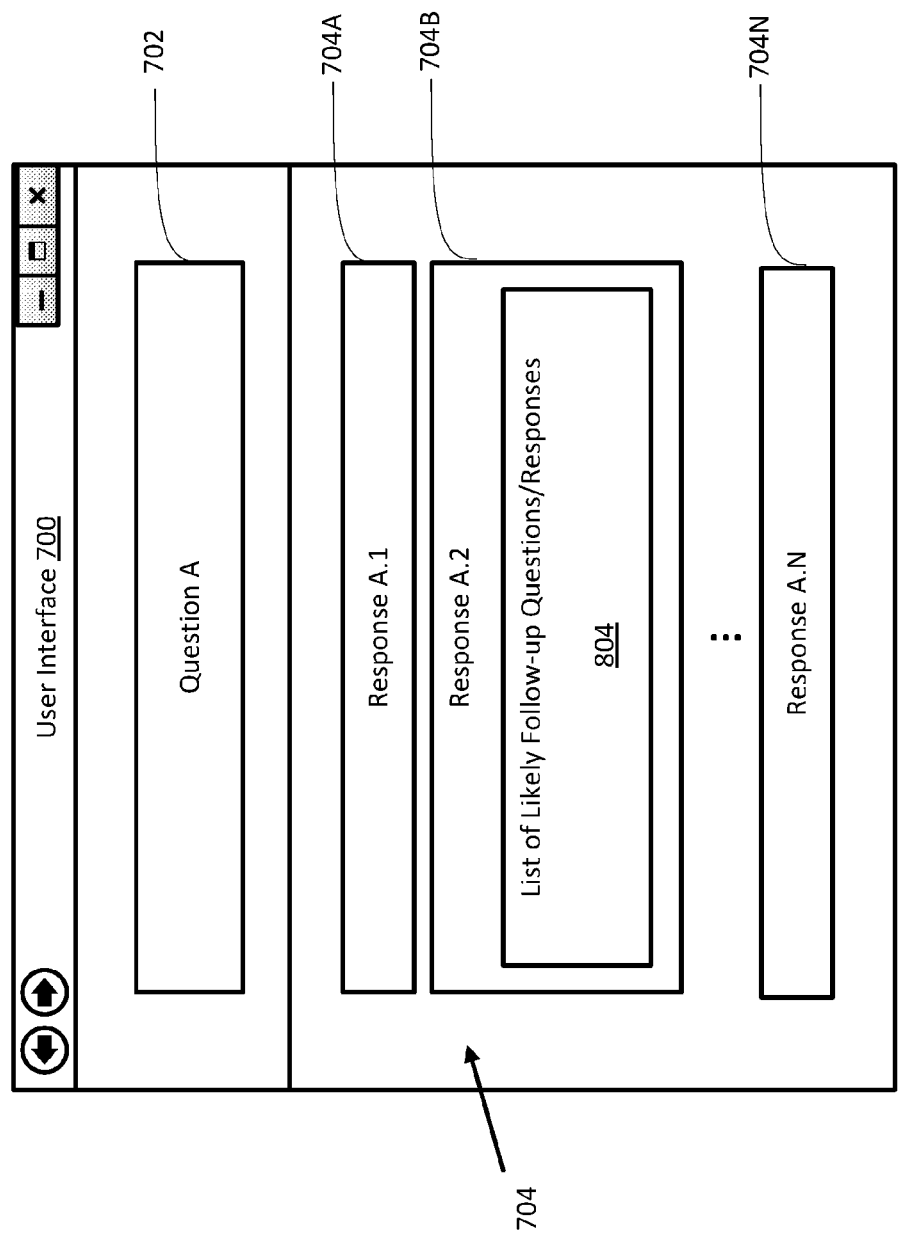
FIG. 9 depicts an alternate modification to the response of FIG. 7 as updated using a response follow-up system in accordance with an embodiment.

FIG. 7 depicts a user interface 700 with a response 704 to a question 702 in accordance with an embodiment. The user interface 700 may be presented on one of the browser applications 116A-N of FIG. 1. Upon entering question 702 in a natural language format, the question 702 is sent to the question-answering system 108 of FIG. 1 to determine and retrieve response 704. The response 704 includes multiple response terms 704A-N, such as instructions and/or information. The response follow-up system 110 of FIG. 1 can apply techniques as described herein to determine one or more follow-up questions 128 based on the response terms 704A-N. Rather than returning only the response 704, the response follow-up system 110 may also return a modification to the response 704 as link 802 of FIG. 8 that modifies an aspect of user interface 700 based on the one or more follow-up questions 128. In the example of FIG. 8, the link 802 can be a hyperlink to a follow-up question or a follow-up response to the follow-up question associated with response term 704B. In other embodiments, a list of one or more follow-up questions and/or follow-up responses 804 (FIG. 9) can be embedded in the response 704, such as an expandable list associated with a particular response term in the response 704.

Figure 10:
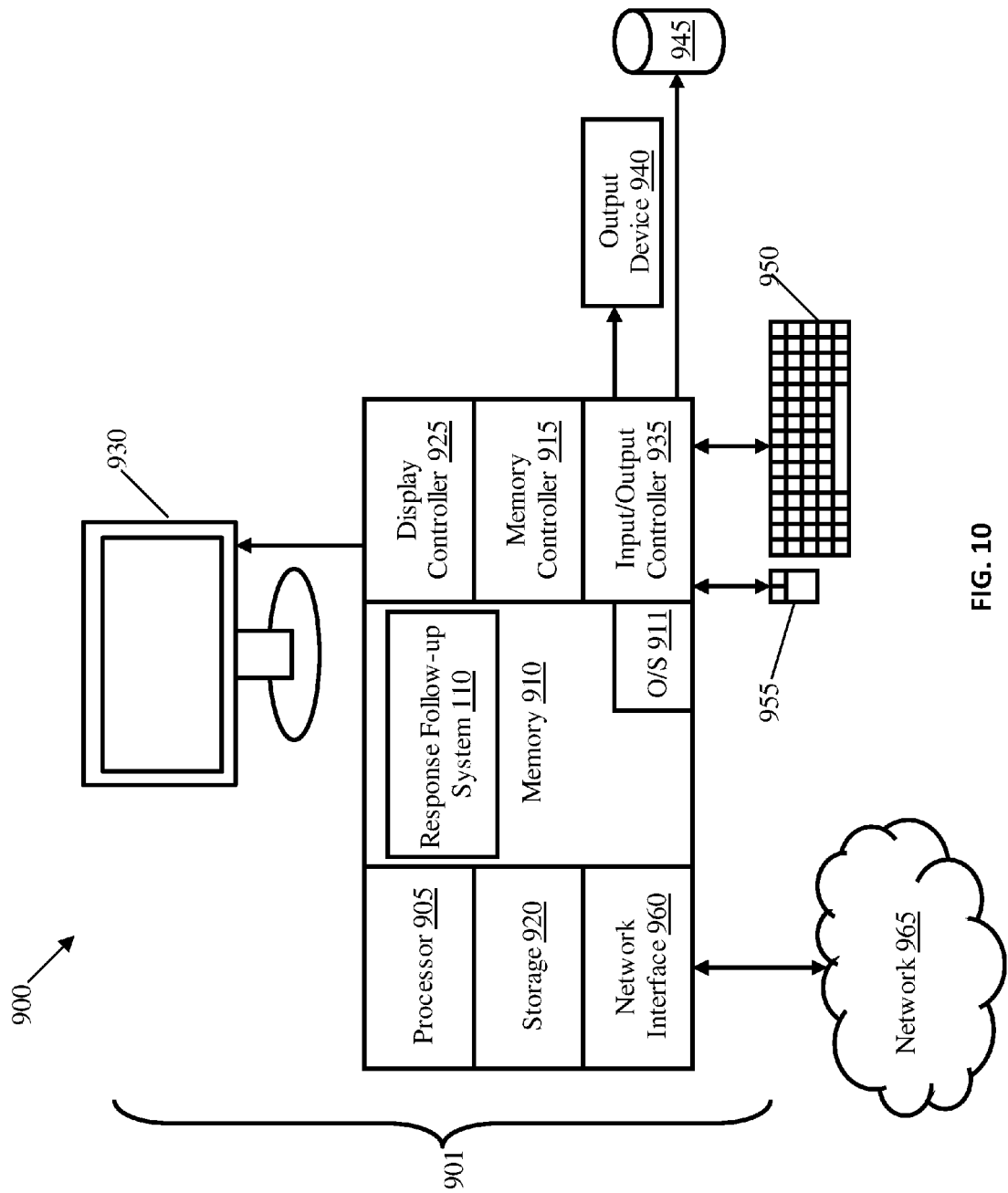
FIG. 10 depicts a block diagram of a computing device for implementing aspects of the system in accordance with an embodiment.

Turning now to FIG. 10, a block diagram of a computing device for implementing some or all aspects of the system is generally shown in accordance with an embodiment. FIG. 10 illustrates a block diagram of a computing device 900 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 900, such as a cellular phone, a personal digital assistant (PDA), tablet computer, personal computer, workstation, minicomputer, or mainframe computer for example.

In some embodiments, as shown in FIG. 10, the computing device 900 includes a processor 905, memory 910 coupled to a memory controller 915, and one or more input devices 945, and output devices 940, which are communicatively coupled via a local I/O controller 935. These devices 940, 945 may include, for example, a printer, a scanner, a microphone, and the like. Input devices such as a conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 940, 945 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 910. The processor 905 may be a custom made or commercially available processor, a central processing unit (CPU), an auxiliary processor among several processors associated with the computing device 900, a semiconductor based microprocessor (in the form of a microchip or chip set), a macroprocessor, or other device for executing instructions.

The memory 910 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, or other types of storage media. Note that the memory 910 may have a distributed architecture, where various components are situated remote from one another but may be accessed by the processor 905.

The instructions in memory 910 may include one or more separate programs, each of which comprises an ordered listing of executable instructions for implementing logical functions. In the example of FIG. 10, the instructions in the memory 910 include a suitable operating system (OS) 911. The operating system 911 essentially may control the execution of other computer programs and provides scheduling, input-output control, file and data management, memory management, and communication control and related services. The instructions in the memory 910 also include instructions for implementing embodiments of the response follow-up system 110 described herein.

Additional data, including, for example, instructions for the processor 905 or other retrievable information, may be stored in storage 920, which may be a storage device such as a hard disk drive or solid state drive. The stored instructions in memory 910 or in storage 920 may include those enabling the processor to execute one or more aspects of the systems and methods of this disclosure.

The computing device 900 may further include a display controller 925 coupled to a display 930. In some embodiments, the computing device 900 may further include a network interface 960 for coupling to a network 965, such as network 106 of FIG. 1. The network 965 may be an IP-based network for communication between the computing device 900 and an external server, client and the like via a broadband connection. The network 965 transmits and receives data between the computing device 900 and external systems. In some embodiments, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 900, such as that illustrated in FIG. 10.

Figure 11:
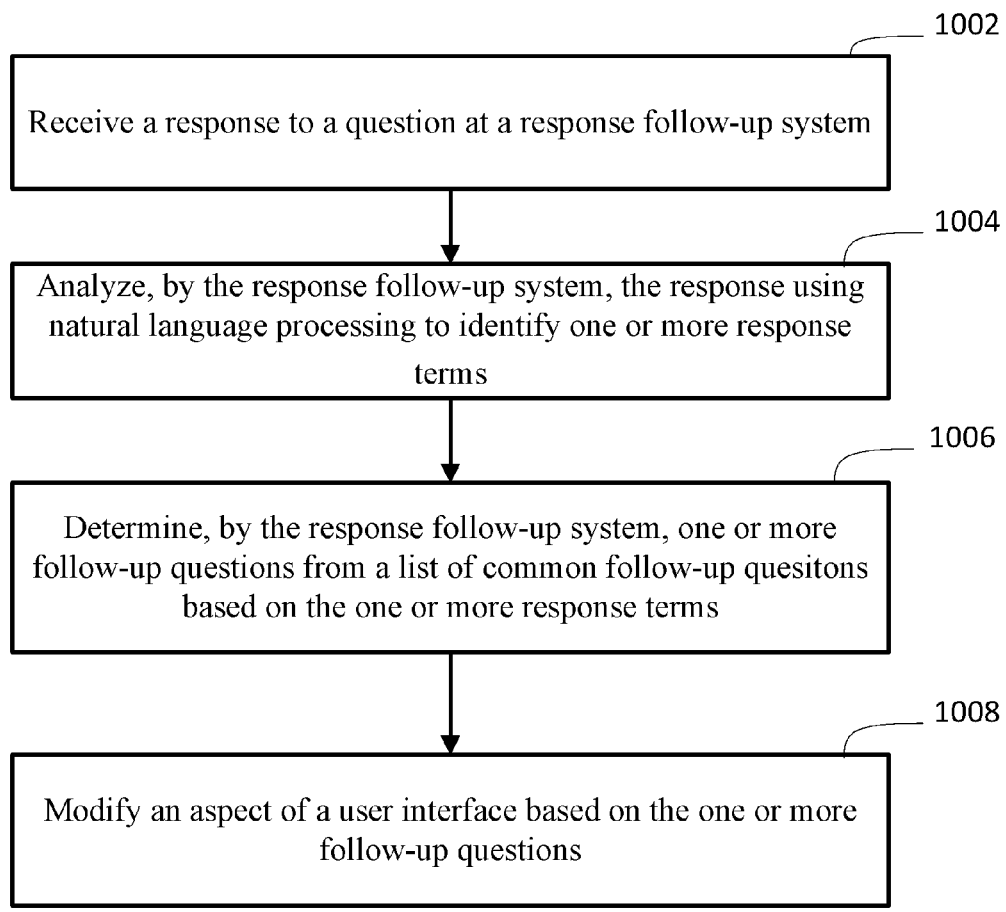
FIG. 11 depicts a flow diagram for automated response follow-up in accordance with an embodiment.

Turning now to FIG. 11, a flow diagram of a process 1000 for automated response follow-up is generally shown in accordance with an embodiment. The process 1000 is described in reference to FIGS. 1-10 and may include additional steps beyond those depicted in FIG. 11. The process 1000 is described with respect to response follow-up system 110 but may be performed separately by or in combination with one or more other applications.

The question-answering system 108 can receive a question from one of the browser applications 116A-N. The question-answering system 108 may determine a response to the question by accessing content 114A-N through the content servers 112A-N (e.g., response 204A with respect to question 202A). At block 1002, the response to the question is received at the response follow-up system 110.

At block 1004, the response follow-up system 110 analyzes the response using natural language processing 130 to identify one or more response terms, such as response terms 704A-N. The response follow-up system 110 can also analyze the question to identify one or more question terms in the question. For example, question 202A may be composed of multiple question terms that can be used to identify the question 202A and its relation to question-response pair 206A and other questions 202B-202N in a sequence 200 of questions. The question and/or question terms can be stored as questions 124 in repository 122. The response and/or response terms can be stored as responses 126 in repository 122.

At block 1006, the response follow-up system 110 determines one or more follow-up questions 128 based on the one or more response terms. A question-response pair 206 can be identified based on the one or more question terms and the one or more response terms. A list of common follow-up questions associated with the question-response pair 206 can be accessed. The one or more follow-up questions 128 can be selected from the list of common follow-up questions based on the question-response pair 206. The list of common follow-up questions can be added to as one or more additional follow-up questions are observed. The one or more follow-up questions 128 may be determined by identifying a highest ranked subset of the one or more follow-up questions 128 from the list of common follow-up questions based on one or more of: a distance score of the one or more follow-up questions 128 relative to the one or more response terms 704A-N, a history of selection metric, and a user feedback metric.

At block 1008, the response follow-up system 110 modifies an aspect of a user interface, such as user interface 700, based on the one or more follow-up questions 128. The user interface 700 can be modified by displaying the one or more follow-up questions 128 or links to the one or more follow-up questions 128. The response follow-up system 110 may determine one or more follow-up responses to the one or more follow-up questions 128. The user interface 700 can be modified by displaying the one or more follow-up responses in combination with the response or by displaying a link to the one or more follow-up responses with the response, such as response 204B or a link to response 204B with response 204A. One or more additional responses to the question may also be received at the response follow-up system 110. The response follow-up system 110 can determine one or more additional follow-up questions from the list of common follow-up questions based on the one or more additional responses. The one or more additional follow-up questions can be output in combination with the one or more follow-up questions 128 to the user interface 700.

Figure 12:
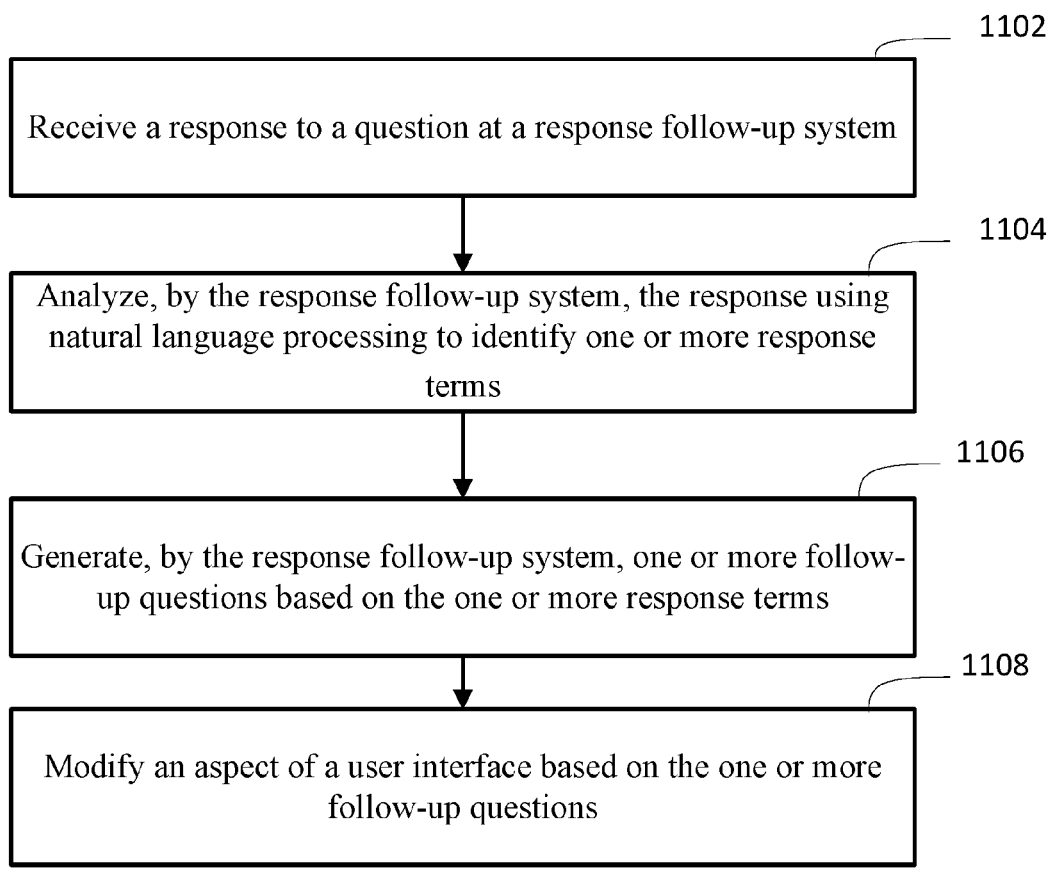
FIG. 12 depicts another flow diagram for automated response follow-up in accordance with an embodiment.

Alternatively, the one or more follow-up questions 128 can be determined based on the one or more response terms 704A-N by using the one or more response terms 704A-N to generate the one or more follow-up questions 128, for instance, by identifying commands, negative limitations, acronyms, and the like within the one or more response terms as further described with reference to process 1100 of FIG. 12. The process 1100 is described in reference to FIGS. 1-10 and may include additional steps beyond those depicted in FIG. 12. The process 1100 is described with respect to response follow-up system 110 but may be performed separately by or in combination with one or more other applications.

The question-answering system 108 can receive a question from one of the browser applications 116A-N. The question-answering system 108 may determine a response to the question by accessing content 114A-N through the content servers 112A-N (e.g., response 204A with respect to question 202A). At block 1102, the response to the question is received at the response follow-up system 110.

At block 1104, the response follow-up system 110 analyzes the response using natural language processing 130 to identify one or more response terms, such as response terms 704A-N. At block 1106, the response follow-up system 110 generates one or more follow-up questions 128 based on the one or more response terms 704A-N. The response follow-up system 110 can determine one or more variants of the one or more response terms 704A-N and generate the one or more follow-up questions 128 based on the one or more variants of the one or more response terms 704A-N. The response follow-up system 110 can determine a response confidence of the one or more follow-up questions 128 and filter the one or more follow-up questions 128 to remove at least one follow-up question having a lowest response confidence. The response follow-up system 110 may analyze a corpus of documents to produce an concept frequency-inverse document frequency for concepts in the documents and identify concepts in the one or more response terms 704A-N having a lower concept frequency-inverse document frequency in the documents as a basis for generating the one or more follow-up questions 128. The response follow-up system 110 can also or alternatively search for concepts in the one or more response terms 704A-N across the corpus to determine a usage context of the one or more response terms 704A-N and apply the usage context in generating the one or more follow-up questions 128.

At block 1108, the response follow-up system 110 modifies an aspect of a user interface, such as user interface 700, based on the one or more follow-up questions 128. The user interface 700 can be modified by displaying the one or more follow-up questions 128 or links to the one or more follow-up questions 128. The response follow-up system 110 may determine one or more follow-up responses to the one or more follow-up questions 128. The user interface 700 can be modified by displaying the one or more follow-up responses in combination with the response or by displaying a link to the one or more follow-up responses with the response, such as response 204B or a link to response 204B with response 204A. One or more additional responses to the question may also be received at the response follow-up system 110. The response follow-up system 110 can determine one or more additional follow-up questions based on the one or more additional responses. The one or more additional follow-up questions can be output in combination with the one or more follow-up questions 128 to the user interface 700.

Technical effects and benefits include automating the creation of follow-up questions based on a response to a question in a question-answering computer system. An aspect of a user interface is modified based on the one or more follow-up questions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, from a user, a response to a question at a response follow-up system;
   analyzing, by the response follow-up system, the response using natural language processing to identify one or more response terms;
   generating, by the response follow-up system, one or more follow-up questions based on the one or more response terms, the generating comprising:
   analyzing a corpus of documents to produce a concept frequency-inverse document frequency for concepts in the corpus of documents; and
   identifying concepts in the one or more response terms having a lower concept frequency-inverses document frequency in the corpus of documents as a bases for generating the one or more follow-up questions;

pre-fetching, based on the response, one or more follow-up responses to the one or more follow-up questions from one or more content provider systems comprising one or more content servers, wherein a question answering system comprising the response follow-up system is communicatively coupled to the one or more content provider systems through a network; and modifying an aspect of a user interface displayed to the user based on the one or more follow-up questions and the one or more follow-up responses.

2. The method of claim 1, further comprising:
determining one or more variants of the one or more response terms;
generating the one or more follow-up questions based on the one or more variants of the one or more response terms;
determining a response confidence of the one or more follow-up questions; and
filtering the one or more follow-up questions to remove at least one follow-up question having a lowest response confidence.

3. The method of claim 1, further comprising:
searching for concepts in the one or more response terms across the corpus of documents to determine a usage context of the one or more response terms; and
applying the usage context in generating the one or more follow-up questions.

4. The method of claim 1, wherein the user interface is modified by displaying the one or more follow-up questions.

5. The method of claim 1, wherein the user interface is modified by displaying the one or more follow-up responses in combination with the response.

6. The method of claim 1, wherein the user interface is modified by displaying a link to the one or more follow-up responses with the response.

7. The method of claim 1, further comprising:
receiving one or more additional responses to the question at the response follow-up system;
determining one or more additional follow-up questions based on the one or more additional responses; and
outputting the one or more additional follow-up questions in combination with the one or more follow-up questions to the user interface.

8. A system, comprising:
a memory having computer readable instructions; and
a processor for executing the computer readable instructions, the computer readable instructions including:
receiving, from a user, a response to a question at a response follow-up system; analyzing, by the response follow-up system, the response using natural language processing to identify one or more response terms;
generating, by the response follow-up system, one or more follow-up questions based on the one or more response terms, the generating comprising:
analyzing a corpus of documents to produce a concept frequency-inverse document frequency for concepts in the corpus of documents; and
identifying concepts in the one or more response terms having a lower concept frequency-inverse document frequency in the corpus of documents as a basis for generating the one or more follow-up questions;

pre-fetching, based on the reponse, one or more follow-up responses to the one more follow-up questions form one or more content provider systems comprising one or more content servers, wherein a question answering system comprising the response follow-up system is communicatively coupled to the one or more content provider systems through a network; and modifying an aspect of a user interface displayed to the user based on the one or more follow-up questions and the one or more follow-up responses.

9. The system of claim 8, wherein the computer readable instructions further comprise:
determining one or more variants of the one or more response terms;
generating the one or more follow-up questions based on the one or more variants of the one or more response terms;
determining a response confidence of the one or more follow-up questions; and
filtering the one or more follow-up questions to remove at least one follow-up question having a lowest response confidence.

10. The system of claim 9, wherein the computer readable instructions further comprise:
searching for concepts in the one or more response terms across the corpus of documents to determine a usage context of the one or more response terms; and
applying the usage context in generating the one or more follow-up questions.

11. The system of claim 8, wherein the user interface is modified by displaying the one or more follow-up questions.

12. The system of claim 8, wherein the user interface is modified by displaying the one or more follow-up responses in combination with the response.

13. The system of claim 8, wherein the user interface is modified by displaying a link to the one or more follow-up responses with the response.

14. The system of claim 8, wherein the computer readable instructions further comprise:
receiving one or more additional responses to the question at the response follow-up system;
determining one or more additional follow-up questions based on the one or more additional responses; and
outputting the one or more additional follow-up questions in combination with the one or more follow-up questions to the user interface.

15. A computer program product comprising a computer readable storage medium having program instructions embodied therewith, the program instructions executable by a processor to cause the computer processor to perform:
receiving, from a user, a response to a question at a response follow-up system;
analyzing, by the response follow-up system, the response using natural language processing to identify one or more response terms;
generating, by the response follow-up system, one or more follow-up questions based on the one or more response terms, the generating comprising:
analyzing a corpus of documents to produce a concept frequency-inverse document frequency for concepts in the corpus of documents; and
identifying concepts in the one or more response terms having a lower concept frequency-inverse document frequency in the corpus of documents as a basis for generating the one or more follow-up questions;

pre-fetching, based on the response, one or more follow-up responses to the one or more follow-up questions from one or more content provider systems comprising one or more content servers, wherein a question answering system comprising the response follow-up system is communicatively coupled to the one or more content provider systems through a network; and modifying an aspect of a user interface displayed to the user based on the one or more follow-up questions and the one or more follow-up responses.

16. The computer program product of claim 15, wherein the program instructions executable by the processor further cause the computer processor to perform:

determining one or more variants of the one or more response terms; generating the one or more follow-up questions based on the one or more variants of the one or more response terms;

determining a response confidence of the one or more follow-up questions; and filtering the one or more follow-up questions to remove at least one follow-up question having a lowest response confidence.

17. The computer program product of claim 15, wherein the program instructions executable by the processor further cause the computer processor to perform:

searching for concepts in the one or more response terms across the corpus of documents to determine a usage context of the one or more response terms; and applying the usage context in generating the one or more follow-up questions.

* * * * *